W. B. NILSSON.
APPARATUS FOR BEATING SOAP LATHER.
APPLICATION FILED DEC. 23, 1912.
1,085,992.
Patented Feb. 3, 1914.
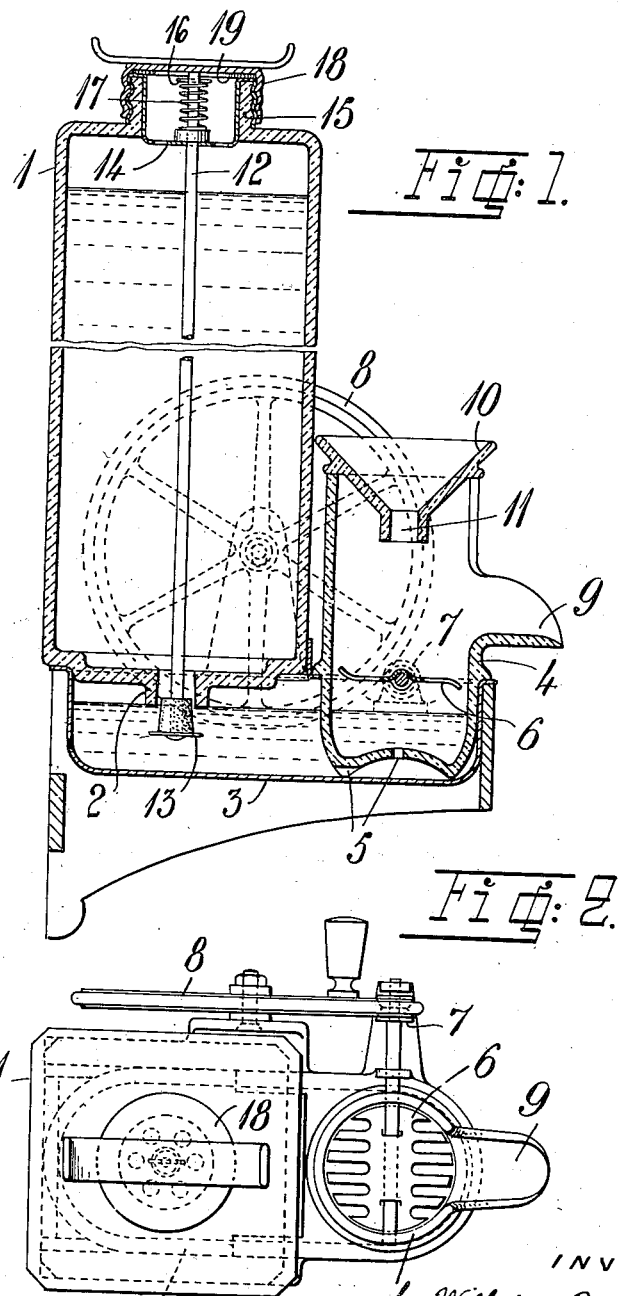

UNITED STATES PATENT OFFICE.

WILHELM BERNHARD NILSSON, OF STOCKHOLM, SWEDEN.

APPARATUS FOR BEATING SOAP-LATHER.

1,085,992.  Specification of Letters Patent.  Patented Feb. 3, 1914.

Application filed December 23, 1912. Serial No. 738,370.

*To all whom it may concern:*

Be it known that I, WILHELM BERNHARD NILSSON, a subject of the King of Sweden, residing at Flemminggatan 10, Stockholm, Sweden, have invented new and useful Improvements in Apparatus for Beating Soap-Lather, of which the following is a specification.

The present invention relates to an apparatus for beating soap-lather.

The apparatus consists essentially of a vessel hermetically closed at its upper end for the soapy solution, and this vessel communicates at its lower end by means of an opening with another vessel into which the soapy solution runs down until it reaches the same level as the lower edge of the said opening. On account of the vacuum in the upper vessel the solution is balanced in both vessels. With the lower vessel communicates furthermore a third vessel, in which there is a mechanically driven beating or whipping device, e. g. rotary wings or other devices, with which the soapy solution is beaten into a lather.

Figure 1 on the accompanying drawing is a vertical section through such an apparatus. Fig. 2 is a plan view of the same.

1 designates a vessel hermetically closed at its upper end, for the soapy solution. This vessel is best made of glass. The same communicates through a tubular opening 2 or such like in its bottom with a vessel 3 underneath, and this latter can by some means or other be heated from below. With this lower vessel communicates also a third, smaller vessel 4 through one or more holes or channels 5 in the bottom of the last mentioned vessel. In vessel 4, which according to the drawing is lowered into vessel 3, the soapy solution rises to the same level as in vessel 3. In vessel 4 rotary wings 6 or some other stirring device is arranged, on whose shaft a friction pulley 7 is fastened, and this engages a friction wheel 8, which can be turned by hand or in some other way in such a manner that the wings 6 are made to rotate rapidly, and turn the soapy solution in the vessel 4 into lather. Vessel 4 is provided with a lateral outlet 9, as well as a lid 10 developed into a vessel or funnel, and provided with one or more holes 11. The upper vessel 1 is traversed by a valve spindle 12, which below the tubular opening 2 has a valve 13, which is meant on certain occasions to fit from the outside into tubular opening 2 and close the latter. The upper end of the spindle 12 sticks up through a perforated wall 14 into a neck 15 of vessel 1, and is surrounded by a spiral spring 14 placed between the said wall and a cheek 16 on the spindle. On the neck 15 is screwed a lid 18, which, when screwed in, pushes the spindle 12 down against the action of spring 17.

19 is a washer, which, when the lid 18 is screwed home, lies tightly between the latter and the neck 15. Normally the lid is kept tightly screwed down, when the valve 13 is kept open on account of the downward pressure exerted by the lid upon the spindle 12. When the vessel 1 is to be filled, the lid 18 is unscrewed, when the spring 17 expands and closes the valve 13.

When beating the soapy solution into a lather, the lather rises in vessel 4 and runs off through outlet 9. As the liquid is sinking in vessel 3 air bubbles rise up into the chamber above the surface of the liquid in vessel 1, by which means the vacuum is being reduced to such an extent that the surface of the liquid in vessels 3 and 4 is always being kept constant. Any solution that may possibly run down with the foam may be poured back into the bowl-shaped lid 10, through whose hole 11 it runs back to the vessel 4.

I claim:—

1. An apparatus for beating soap lather consisting of two communicating vessels, a third vessel for a soapy solution having a normally closed opening at its upper end and communicating with one of said first named vessels through a normally open outlet at its lower end, and means for beating the soapy solution into a foam in the other of said first named vessels.

2. An apparatus for beating soap lather consisting of two communicating vessels, a third vessel for a soapy solution having a normally closed opening at its upper end and communicating with one of said first named vessels through a normally open outlet at its lower end, closing devices for said opening and said outlet coöperating in such a manner that one opens when the other closes and vice versa, and means for beating the soapy solution into a foam in the other of said first named vessels.

3. An apparatus for beating soap lather consisting of two communicating vessels, a third vessel for a soapy solution having a normally closed opening at its upper end and communicating with one of said first named vessels through a normally open outlet at its lower end, a valve spindle in the said third vessel having at its upper end a screw lid for closing the said opening and at its lower end a valve for closing the said outlet when the lid is unscrewed, and means for beating the soapy solution into a foam in the other of said first named vessels.

In testimony whereof I have signed my name to this specification in the presence of two subscribing witnesses.

WILHELM BERNHARD NILSSON.

Witnesses:
   J. F. A. RUTBACK,
   MARGARETA PRINCE.